United States Patent [19]

Womack et al.

[11] Patent Number: 5,781,299
[45] Date of Patent: Jul. 14, 1998

[54] DETERMINING THE COMPLEX REFRACTIVE INDEX PHASE OFFSET IN INTERFEROMETRIC FLYING HEIGHT TESTING

[75] Inventors: Kenneth H. Womack, San Diego; L. Allan Butler, Carlsbad, both of Calif.

[73] Assignee: Phase Metrics, San Diego, Calif.

[21] Appl. No.: 719,252

[22] Filed: Sep. 24, 1996

[51] Int. Cl.$^6$ .................... G01B 11/02; G01N 21/41
[52] U.S. Cl. ............................. 356/357; 356/361
[58] Field of Search ........................ 356/357, 361

[56] References Cited

U.S. PATENT DOCUMENTS

| | | | |
|---|---|---|---|
| 4,593,368 | 6/1986 | Fridge et al. | 356/357 |
| 4,630,926 | 12/1986 | Tanaka et al. | 356/357 |
| 4,813,782 | 3/1989 | Yagi et al. | 356/357 |
| 5,280,340 | 1/1994 | Lacey | 356/357 |
| 5,410,402 | 4/1995 | Li et al. | 356/357 |
| 5,453,831 | 9/1995 | Li et al. | 356/357 |
| 5,557,399 | 9/1996 | de Groot | 356/357 |

*Primary Examiner*—David C. Nelms
*Assistant Examiner*—Jason D. Vierra-Eisenberg
*Attorney, Agent, or Firm*—Blakely Sokoloff Taylor & Zafman

[57] ABSTRACT

An apparatus and method for optically measuring the air gap between a transparent glass disk and an air bearing slider without separately measuring the real index of refraction n and extinction coefficient k of the slider using an external ellipsometer. The phase offset required to compute the air gap is computed from a measurement of the air slider reflectivity and from an empirically derived equation that correlates the index of refraction with the reflectance of the slider. The apparatus includes a light source for directing a light beam through the transparent member and air gap, and onto the reflective slider. The light reflects off of the slider and the transparent member to create an interference pattern. The reflected light is detected by a photodetector that is coupled to a computer. The slider reflectivity r is found from the reflected light. An empirically derived linear equation which correlates the real part (n) of the slider refractive index to reflectivity (r) is next used to estimate n from r. Given n and r the phase offset and space can then be calculated.

34 Claims, 5 Drawing Sheets

DETERMINING THE COMPLEX REFRACTIVE INDEX PHASE OFFSET IN INTERFEROMETRIC FLYING HEIGHT TESTING

BACKGROUND OF THE INVENTION

1. Field of the Invention

The present invention relates to the interferometric measurement of small spacings. In particular, the present invention pertains to in-situ determination of the phase offset due to the complex refractive index.

2. Description of Related Art

Hard disk drives contain a magnetic transducer(s) that reads and writes a pattern of magnetic bits in a thin magnetic film coated on a rotating disk. The magnetic transducer is integrated into a slider that is assembled with a gimbal mounting to a suspension arm. The whole device is a head gimbal assembly (HGA). Rotation of the disk drags air between the slider and the disk thus lifting the slider off the disk surface. The presence of this air gap created by the rotating disk reduces mechanical wear on the slider and the disk. It is literally an air bearing. The thickness of the air gap can vary depending upon the spring rate of the suspension arm, hydrodynamic characteristics of the slider, temperature, pressure and other factors.

When mass producing hard disk drives, it is desirable to measure the air bearing gap distance for each HGA to insure that the gap is within operational tolerances. The air bearing gap can be measured by loading the HGA into a flying height tester. The HGA is placed adjacent to a rotating transparent glass substrate of the flying height tester. The substrate is typically a disk. A light beam is then directed through the glass substrate and onto the slider. The reflection of light from the slider and the substrate air bearing interface creates an interference pattern that is detected by a photodetector. The thickness of the air gap can be computed from the interference pattern using the following equation.

$$\frac{I_{out}}{I_{in}} = \frac{r^2 + s^2 + 2rs\cos\left(\frac{4\pi H}{\lambda} - \Phi\right)}{1 + r^2 s^2 + 2rs\cos\left(\frac{4\pi H}{\lambda} - \Phi\right)}$$

where:

r=amplitude reflection off glass substrate.
s=amplitude reflection off slider.
$\lambda$=wavelength of illuminating light.
H height of the air gap.
$\Phi$=phase offset on reflection.

The variable r is calculated from the known refractive index (n) of the glass disk by $$r = \frac{n-1}{n+1}.$$

At a maximum of the interference pattern, the cos terms in the numerator and denominator of the interference equation are both 1. Then s can be calculated from the reflectively $$\left.\frac{I_{out}}{I_{in}}\right|$$

max measured at an interference maximum.

The phase offset $\Phi$ is equal to 180 degrees if the slider material is a dielectric, i.e. it is transparent and light passes through with negligible loss. If on the other hand, the slider is not transparent, then the complex part k of the refractive index differs from zero. The refractive index is n+j·k, where $j=\sqrt{-1}$ in the complex part. The larger the k, the faster the intensity of light declines to zero as it propagates into the material. For metals k is so large that extinction of the light will occur within a small fraction of one wavelength from the surface. Given n and k, phase offset is calculated from the following expression.

$$\Phi = \tan^{-1}\frac{2n_0 k_1}{n_0^2 - n_1^2 - k_1^2}$$

where:

$n_1$=the real part of the index of refraction of the slider or substrate;

$k_1$=the complex part of the index of refraction, i.e. extinction coefficient of the slider or substrate; and, $n_o$=the refractive index of the gap medium located immediately between the slider and substrate, usually air.

Given r, s, and $\Phi$, a measured value of reflectivity $$\frac{I_{out}}{I_{in}}$$

can be solved for the height H of the air gap. A typical $Al_2O_3$—TiC slider material has n+2.2, k=0.4 and consequently a $\Phi$=168 degrees. The 12 degree deficit from 180 degrees would cause a 0.3 to 0.4 micro-inch error in H if the correct phase offset was not used.

In conventional interferometric flying height testers the n and k values are computed from ellipsometric parameters $\psi$ and $\Delta$ which are measured by an external ellipsometer. The n and k values are then manually entered into the computer of the flying height tester to be used in determining the air gap.

Sliders are typically constructed from a ceramic material such as $Al_2O_3$—TiC which contains a granular structure The grain structure may vary from slider to slider. The size and content of the grain structure may change the n and k values of the slider. Any deviation from the n and k values that are measured by the ellipsometer and entered into the flying height tester will reduce the accuracy of the flying height measurements. Having to measure the n and k values for each batch of sliders is time-consuming and costly. Additionally, ellipsometers typically measure a relationship between the p and s polarization of light and do not account for different reflectance losses of the s and p polarized light, further reducing the accuracy of n and k measurements. It would therefore be desirable to provide an interferometric flying height tester with in-situ n and k measurement that does not require separate n and k measurements with an ellipsometer to account for n and k fluctuation. It would also be desirable for the tester to measure phase offset due to n and k using data already available in the flying height tester and account for reflectance losses from the slider. The losses depend on the coarseness of grain size in the slider material, and typically vary from point to point on the same slider depending on uniformity in the mix of $Al_2O_3$ and TiC.

SUMMARY OF THE INVENTION

The present invention is an apparatus and method for optically measuring the air gap between a transparent glass disk and an air bearing slider without separately measuring the real index of refraction n and extinction coefficient k of the slider using an external ellipsometer. The phase offset required to compute the air gap is computed from a measurement of the air slider reflectivity and from an empirically derived equation that correlates the index of refraction with the reflectance of the slider. The apparatus includes a light source for directing a light beam through the transparent member and air gap, and onto the reflective slider. The light reflects off of the slider and the transparent member to create an interference pattern. The reflected light is detected by a photodetector that is coupled to a computer. As the slider is loaded onto or retracted from the glass disk, the range of flying heights H includes values where the reflected intensity is maximum and minimum. The computer measures the maximum and minimum of the interference signal. Alternatively, the flying height can be varied by changing the rotational speed of the glass disk, or adjusting the tool holding the HGA. From maximum and minimum reflectivities and measurements of the reflected signal off the glass disk with no slider present and off a glass reference positioned next to the rotating disk, the slider reflectivity r can be found. An empirically derived linear equation which correlates the real part (n) of the slider refractive index to reflectivity (r) is next used to estimate n from r. Given n and r the phase offset can then be calculated. There is no need to separately measure the real index of refraction with an ellipsometer after the correlation relationship of n to r has been established. Additionally, the computer determines a loss factor for the reflectance when computing the observed reflectance. The technique of the present invention therefore accounts for losses in the reflected light.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
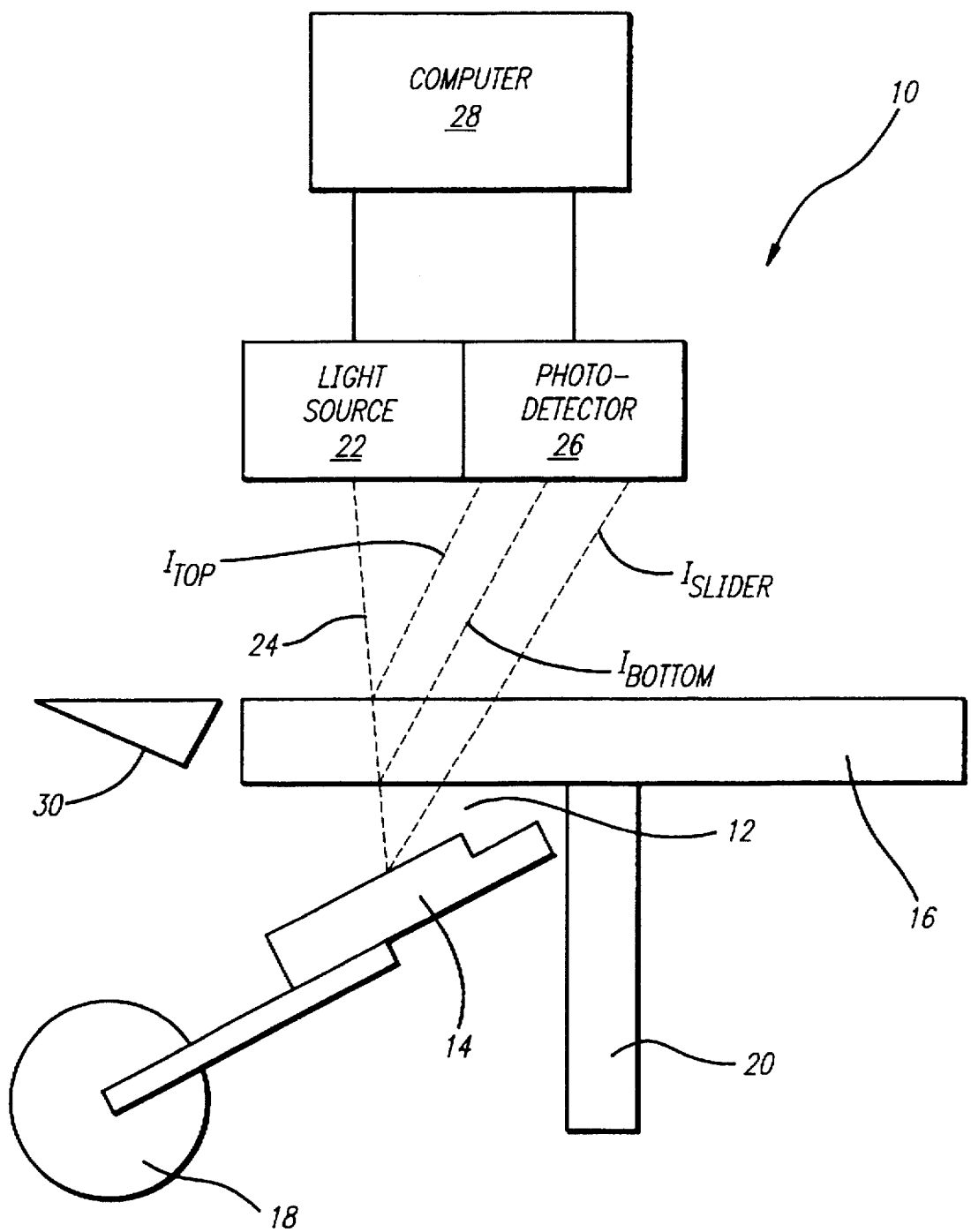
FIG. 1 is a schematic of an apparatus of the present invention.

Referring to the drawings more particularly by reference numbers, FIG. 1 shows a tester 10 of the present invention. The tester 10 is typically utilized to measure the height of an air bearing gap 12 created between a magnetic recording head slider 14 and a substrate 16. Such an apparatus is commonly referred to as a flying height tester. Although a flying height tester is shown and described, it is to be understood that the apparatus of the present invention can be used to measure any space between a reflective member and a transparent reference surface. There is sufficient air-surface reflectivity from transparent materials for these to be an important class of reflective member. The present invention is not limited to opaque or partially obscure reflective members.

The slider 14 is loaded adjacent to the substrate 16 by a loader 18. The substrate 16 is typically constructed from a BK7 glass material. The substrate 16 is rotated by spindle 20.

A light source 22 directs a beam of light 24 through the substrate 16 and onto the slider 14. Part of the light $I_{bottom}$ reflects off of the air-glass interface at the bottom of the disk and another part of the light $I_{slider}$ reflects off of the air-slider interface. A portion of the light $I_{top}$ will also reflect off of the top surface of the substrate 16. The reflected light will recombine to create an interference pattern. The tester 10 contains a photodetector 26 which detects the interference fringes of the reflected light. The detector 26 converts the detected light into electrical signals which are converted into a digital format and provided to a computer 28. The computer 28 utilizes the detected interference fringe information to calculate the height of the air bearing gap. The flying height tester shown in FIG. 1, may be a system sold by Phase Metrics, Inc. of San Diego, Calif.

The tester 10 may be modified to include a prism 30 that is located adjacent to the disk 16. The prism 30 is constructed from the same material as the disk 16 and is used to measure a reflectance from the top surface of the disk 16. The reflectance value can be determined by directing the light beam 24 through the prism 30 and measuring the amount of reflected light $I_{top}$. The prism 30 is constructed to have an internal reflection so that light does not reflect from the bottom surface of the prism 30 back to the photodetectors 26 during the reflectance measurement routine. The prism 30 can be aligned with the light beam 24 by moving the optical system, or by moving the prism 30. It will be appreciated that other means may be implemented for determining the reflected intensity from the top surface of the disk 16. An alternative embodiment for example may comprise a beveled outer edge of the disk 16, which would present a portion of the top disk surface while coating a corresponding portion of the bottom surface. It is not possible to observe separately the reflection $I_{bottom}$ off the bottom of the disk, since it is always seen combined with $I_{top}$. However, by measuring both together and computing the difference between $I_{top}+I_{bottom}$ from the disk minus $I_{top}$ from the prism, the computer can calculate the intensity due to the bottom of the disk alone. Given the glass-air reflectivity calculated from the refractive index of the disk, the absolute intensity of illumination $I_{in}$ incident on the bottom of the glass disk can be found.

The height of the air bearing H can be calculated utilizing the following equation.

$$\frac{I_{out}}{I_{in}} = \frac{R_{ag}^2 + R_{as}^2 + 2R_{ag}R_{as}\cos\delta}{1 + R_{ag}^2 R_{as}^2 + 2R_{ag}R_{as}\cos\delta} \quad (1)$$

where;

$I_{in}$, $I_{out}$=incident and reflected intensities of the light beam;

$R_{ag}$=amplitude reflection off the disk;

$R_{as}$=amplitude reflection off the slider;

$\delta = 4\pi nH/\lambda - \Phi$ n=refractive index of the fluid in the air bearing (air);

$\lambda$=wavelength of illuminating light;

H=height of the air bearing;

$\Phi$=phase offset on reflection.

This equation contains three unknown variables $R_{ag}$, $R_{as}$ and $\Phi$. The phase offset $\Phi$ can be defined as a function of the real index of refraction $n_1$ of the slider and the reflectance $R_{as}$ of the air-slider interface by the equation:

$$\Phi = \cos^{-1}\left(\frac{1 - n_1 - R_{as}(1 + n_1)}{-2n_1\sqrt{R_{as}}}\right) \quad (2)$$

To eliminate one of the unknowns $n_1$ or $R_{as}$, it is desirable to find a relationship between the reflectance $R_{as}$ and the real index of refraction $n_1$. It is noted that the real index of refraction n and the extinction coefficient k are not independent parameters. For a given material n and k are a Hilbert pair, constrained by the Kramers-Kronig relationship given by:

$$n(v_i) - n_\infty = \frac{2}{\pi} \int_0^\infty \frac{k(v)}{v^2 - v_i^2} dv \quad (3)$$

where v is frequency and $v_i$ is the frequency for which n is evaluated. The Hilbert transform indicates that if k is known over all frequencies from the deep ultraviolet to the far infrared then n can be calculated for any desired wavelength or frequency. For most slider materials such as $Al_2O_3$—TiC the reflectance spectra contains no absorption features at or near the visible and so it is reasonable to expect n to vary slowly across the visible spectrum.

Further insight can be gained by considering the alternative Kramers-Kronig equation describing the relationship between the phase offset $\Phi$ and the intensity reflectance R at normal incidence given by the transform:

$$\Phi = \frac{1}{\pi} \int_0^\infty \frac{d\ln\sqrt{R}}{d\lambda} \ln\left|\frac{\lambda + \lambda_o}{\lambda - \lambda_o}\right| d\lambda \quad (4)$$

where $\lambda$ is wavelength and $\lambda_o$ is the wavelength at which the phase offset $\Phi$ is evaluated. It is apparent from the equation that if the reflectance is known over all wavelengths then the phase shift can be calculated. The equation has a weighting factor such that the reflectance in the immediate vicinity of the wavelength of interest matters most. In addition, the local slope of reflectance versus wavelength dominates the contribution to the phase shift integral. If the slope is zero in a portion of the reflectance spectra then that region makes no contribution to the phase offset.

It will therefore be appreciated that when n and k of a material vary slowly over a range of wavelengths, then the corresponding reflectivity will also vary slowly.

Furthermore, it is our observation that the net reflectivity of heterogeneous materials comprising such well-behaved composites is substantially characterized by a composition weighted average of the component reflectivities. For example, for sliders constructed from ceramic materials, it has been observed that the composite reflectivity $r_c$ is well approximated by;

$$r_c = \Sigma_n \alpha_n r_n$$

where, $\alpha_n$ are the percentage compositions of the n components and $r_n$ is the reflectivity of the n component.

Figure 2:
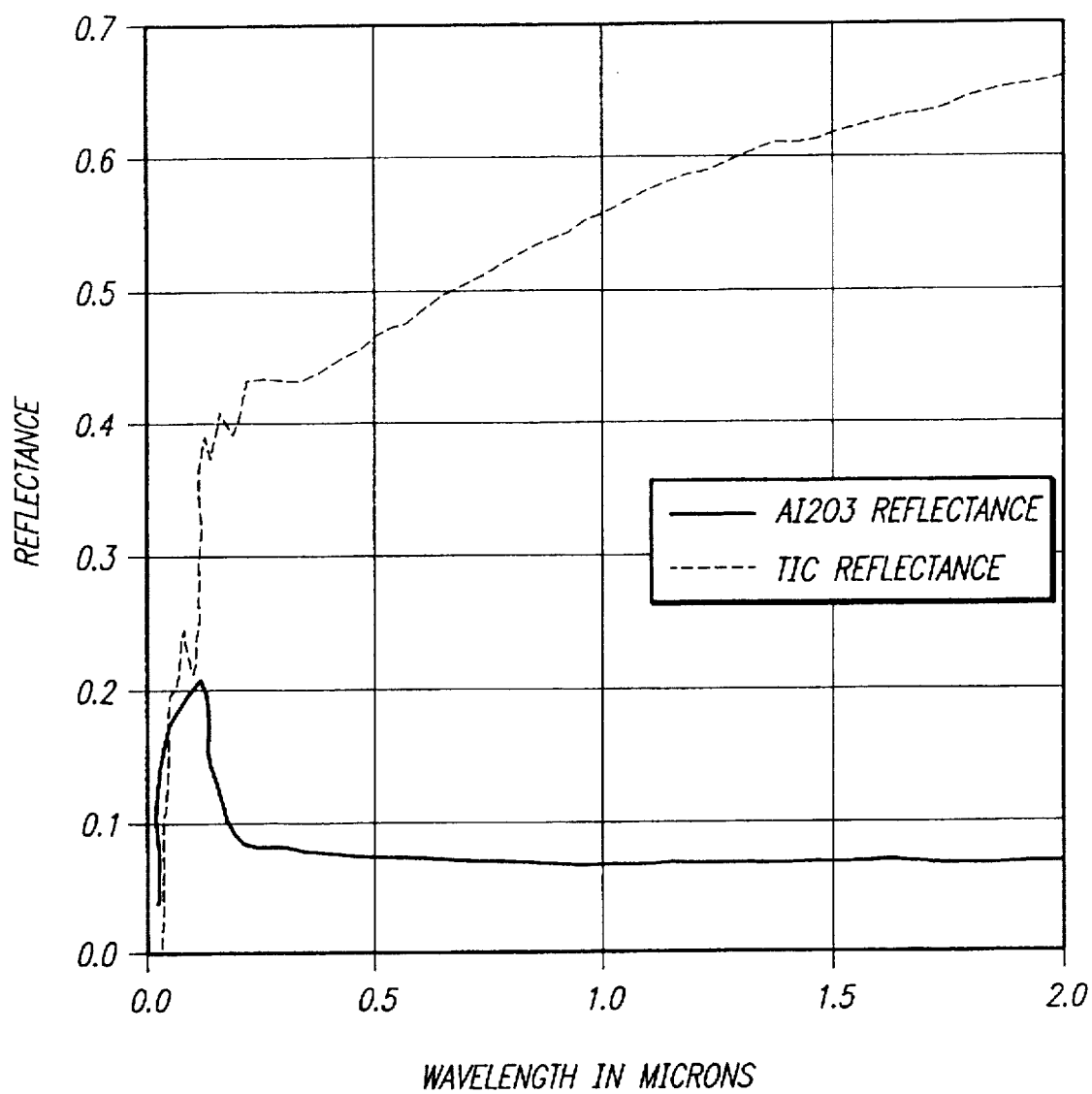
FIG. 2 is a graph showing reflectance versus wavelength of representative slider materials $Al_2O_3$ and $T_iC$.

By way of example, the slider material may be constructed from an $Al_2O_3$—TiC mixture of separate $Al_2O_3$ and TiC grains. As shown in FIG. 2, the reflectivity of the $Al_2O_3$ and TiC in the visible range is approximately 8% and 44%, respectively. For a 30/70 ratio of $Al_2O_3$ to TiC the composite reflectivity is approximately 16%. As shown in FIG. 2 the reflectance/wavelength relationship has a linear slope for wavelengths greater than 0.3 microns.

Changes in reflectance occur at the measurement spot of a flying height tester with small local fluctuations in the mix of TiC and $Al_2O_3$ and the variation in the effective number of grains contained within the measurement spot. This fluctuation in the material will vary the reflectance and the phase offset in accordance with the Kramers-Kronig transform for the phase offset (equation 4). By applying the Kramers-Kronig transform for phase offset over a range of reflectance's, it was discovered that the reflectance varied by a small percentage near the nominal 16% reflectance for $Al_2O_3$—TiC, and that the real index of refraction n versus the reflectance $R_{as}$ closely approximated a linear dependence.

Figure 3:
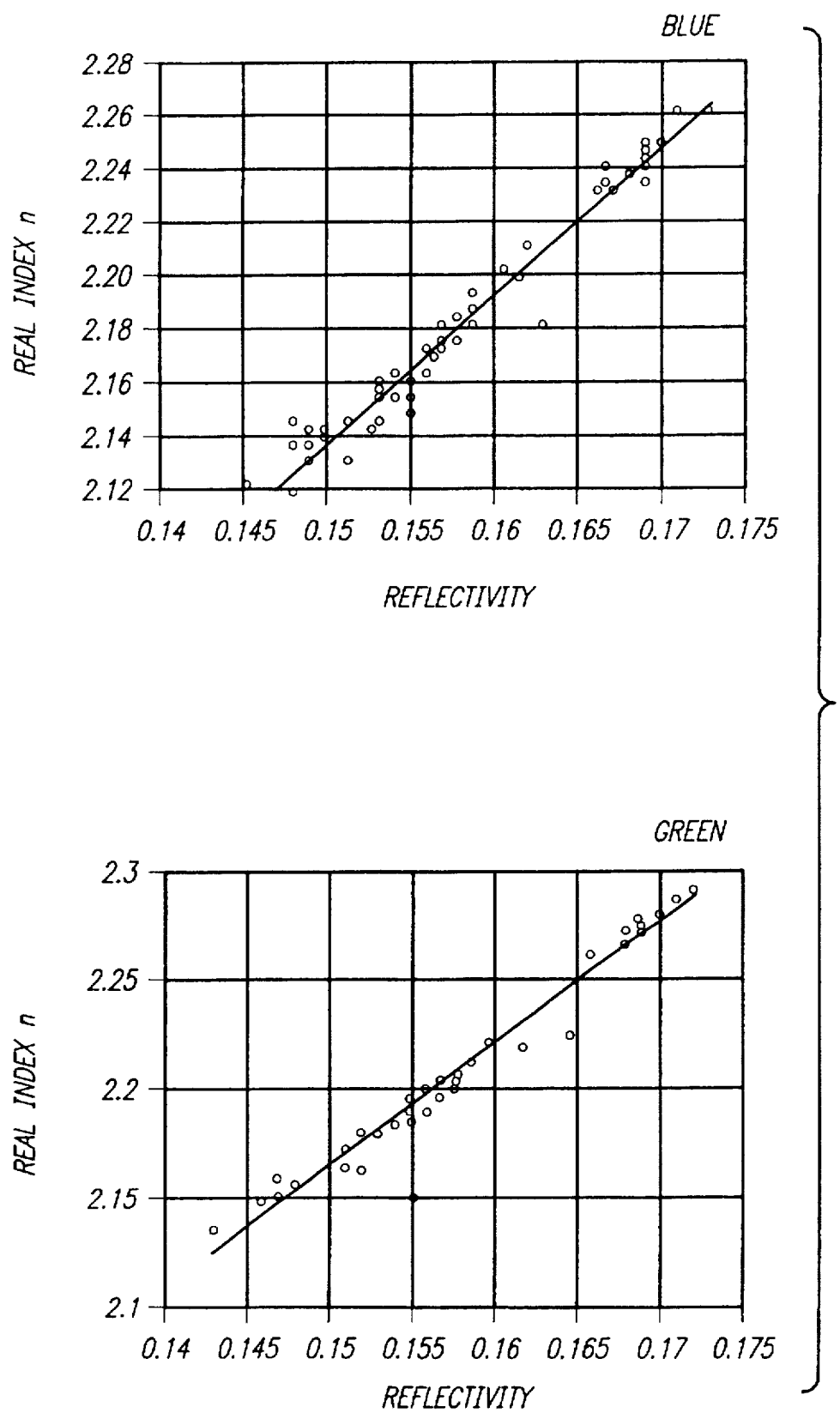
FIG. 3 are graphs showing a real index of refraction versus reflectivity for a plurality of different sliders having varying mixtures of $Al_2O_3$ and TiC.

Sixty different $Al_2O_3$—TiC sliders were measured to determine n versus Ras and plotted as shown in FIG. 3. Performing a least squares fit the following linear equations were derived.

$$n_{1b} = 1.3007 + 5.5781 R_{1b} \text{ for blue light (450 nm)} \quad (5)$$

$$n_{1g} = 1.3092 + 5.6869 R_{1g} \text{ for green light (550 nm)} \quad (6)$$

Although empirically derived equations for blue and green light were derived, it is to be understood that linear equations can be determined for other wavelengths of light. It is recognized that higher order terms could be included in the least squares fit describing the relationship of n to Ras.

The reflectance Ras is computed from the following two equations:

$$R_{max}\text{LOSS} = \frac{R_{ag} + R_{as} + 2\sqrt{R_{ag}R_{as}}}{1 + R_{ag}R_{as} + 2\sqrt{R_{ag}R_{as}}} \quad (7)$$

$$R_{min}\text{LOSS} = \frac{R_{ag} + R_{as} - 2\sqrt{R_{ag}R_{as}}}{1 + R_{ag}R_{as} - 2\sqrt{R_{ag}R_{as}}} \quad (8)$$

where;

$R_{ag}$=the reflectivity of the substrate;

LOSS=the reflectance losses due to scattering, etc.

$R_{max}$ and $R_{min}$ are computed from the following two equations:

$$R_{max} = \frac{(I_{max} - I_{top}) env_{up}}{I_{disk} - I_{top}} R_{disk}(1 - R_{disk}) \quad (9)$$

$$R_{min} = \frac{(I_{min} - I_{top}) env_{dn}}{I_{disk} - I_{top}} R_{disk}(1 - R_{disk}) \quad (10)$$

where;

$I_{max}$=is an interference maximum detected from the interference pattern created by the light beam reflected from the slider-substrate interface;

$I_{min}$=is an interference minimum detected from the interference pattern created by the light beam reflected from the slider-substrate interface;

$I_{disk}$=is the composite reflected signal from both surfaces of the substrate and can be measured by directing the light beam through the substrate when the slider is not adjacent to the substrate;

$I_{top}$=is the reflected signal from the top surface of the disk, and is measured from the prism 30;

$R_{ag}$=is the reflectivity of the substrate, because the material of the substrate is known this is a predetermined variable;

$env_{up}$, $env_{dn}$=describe the falloff in the coherence envelope of the interference signal with increasing height H, and are predetermined variables close to unity.

$R_{max}$ and $R_{min}$ can be computed after measuring the unknown variables cited above. Knowing $R_{max}$ and $R_{min}$, the unknowns LOSS and $R_{as}$ can be computed using equations 7 and 8. By factoring the reflectance LOSS, the method of the present invention accounts for losses in the reflected beam. Without taking into account loss in the reflected beam, $R_{max}$ and $R_{min}$ calculated from equations 9 and 10 are observed to predict different values of Ras which is not possible. Including the loss factor provides consistency with $R_{max}$ and $R_{min}$ predicting a single unique value for $R_{as}$.

As an alternate embodiment the reflectance of the slider Ras can be directly measured at a location away from the substrate. The tester 10 may have a separate microscope and mounting station to measure the reflectance of each slider being tested.

After determining $R_{as}$, the real index is computed from the empirically derived linear equation (equation 5 or 6). Knowing n and $R_{as}$, the phase offset Φ and space H can be computed from equations 2 and 1, respectively.

In operation, sliders 14 with the same general material composition can be measured with a Rudolph or other ellipsometer to create a n versus $R_{as}$ curve similar to the graph shown in FIG. 3. A linear equation correlating n and $R_{as}$ can then be computed and stored in the computer 28. The tester can be calibrated to measure $I_{top}$ by detecting light reflected from the prism 30. $I_{disk}$ can also be measured by directing the light beam through the disk and measuring the reflected light.

A slider 14 is then loaded onto the substrate 16, wherein the rotating disk and slider 14 create an air bearing. The photodetector 26 can detect an interference pattern created by a light beam 24 that is reflected from the slider-disk interface. The detector can detect the interference maxima $I_{max}$ and interference minima $I_{min}$. A retract routine may be performed to vary the height of the air bearing to more accurately detect $I_{max}$ and $I_{min}$, or the rotational speed of the substrate 16 may be varied. The slider 14 is returned to the normal flying height after the retract or RPM routine.

The computer 28 computes $R_{max}$ and $R_{min}$ from the detected interference fringes. Knowing $R_{max}$, $R_{min}$ and $R_{ag}$, the values for LOSS and $R_{as}$ can be computed. The real index of refraction $n_1$ is computed from $R_{as}$ with an empirically derived linear equation. Knowing $n_1$ and $R_{as}$, the computer 28 can compute the phase offset Φ from equation 2. The tester then detects an interference pattern to measure $I_{in}$ and $I_{out}$ to compute the height of the air bearing from equation 1.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, although empirically derived equations correlating the phase offset Φ and the real index of refraction $n_1$ are shown and described, it is to be understood that the phase offset Φ can be defined as a function of $R_{as}$ and the extinction coefficient k, and that a linear equation correlating k and $R_{as}$ can be empirically derived and utilized to compute the air gap between a reflective member and a transparent member.

Figure 4:
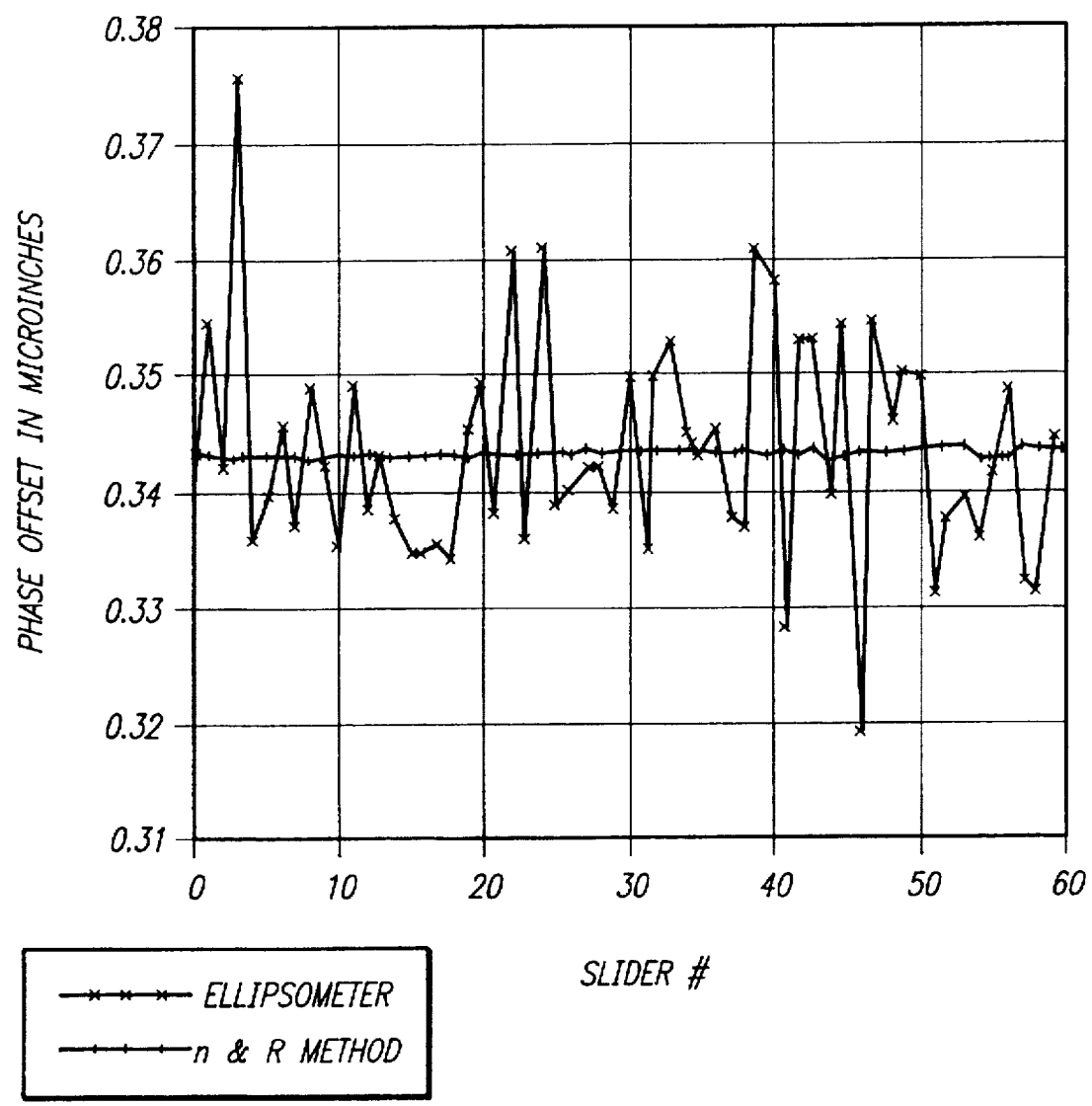
FIG. 4 is a graph showing a measured phase offset for a plurality of sliders.

Additionally, as shown in FIG. 4, the phase offset was determined for 60 uncoated AlTiC sliders from three different types in accordance with the method of the present invention. The air-slider reflectance was determined from the interference intensity maximum and minimum observed by ramping the relative disk/slider velocity in a so-called RPM calibration. The air-slider reflectance was calculated in the manner described above, using as inputs the observed interference maximum, interference minimum, the reflected signal from the glass disk, and the reflected signal from the reference surface (in this case a glass prism). The resulting phase offsets, expressed in micro-inches, are shown in FIG. 4 indexed from each of the respective 60 sliders tested. The observed air-slider reflectivity varied over a range of approximately ±1% for each type of slider. The phase offsets for the 60 sliders were compared to respective phase offsets determined by an independent ellipsometric measurement of the complex refractive index (n−j·k). No attempt was made to measure with the ellipsometer at the same location as that of the maximum and minimum. In addition, the ellipsometer spot size was an ellipse approximately 0.005 inches wide compared with the 0.001 inch square measurement spot of the flying height tester. In spite of these differences, it is apparent that the phase offsets determined in accordance with the present invention accurately reflect the average values as measured by the ellipsometer. It is believed that for typical slider materials, the ellipsometer may actually yield noisier phase offset results as it includes no provisions for depolarization, scatter and diffractive losses which may otherwise influence the ratio of s- and p- polarized light. As will be appreciated from the aforementioned discussion, the present invention includes a method and apparatus that takes into account losses due to diffraction and scattering.

Figure 5:
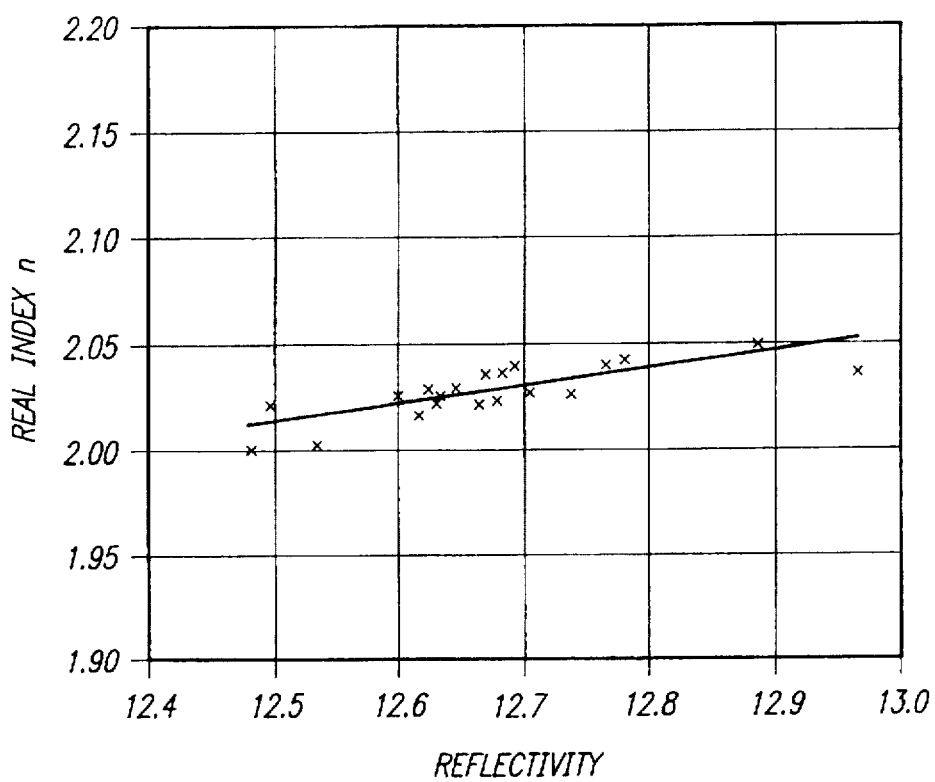
FIG. 5 is a graph showing the index of refraction versus reflectivity for a plurality of sliders.
Figure 6:
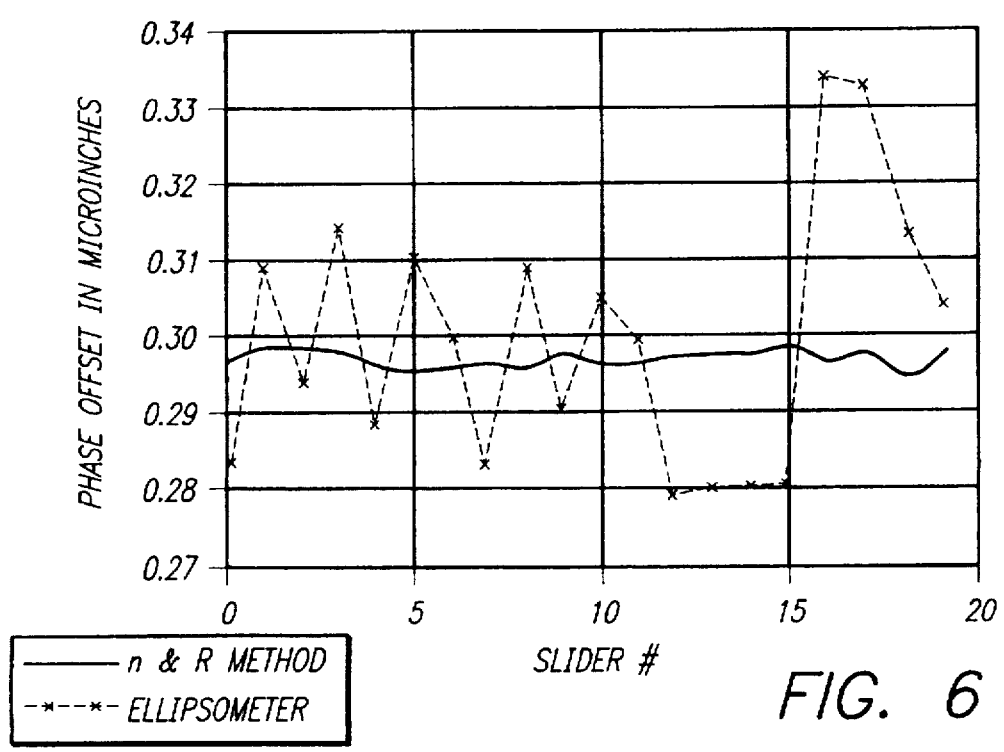
FIG. 6 is a graph showing a phase offset for a plurality of sliders measured by a flying height tester and an ellipsometer.

It will be apparent that the aforementioned method and apparatus provides an effective way to handle phase offset in a flying height interferometer when the slider itself comprises materials having well-behaved optical properties. Moreover, it is anticipated that the present invention may be applied to any slider type, even coated sliders, provided calibration permits measurement of an interference maximum and minimum, and provided that n is a well-defined stable function of the air-slider reflectance. For example, if the only process variable on a coated slider is the coating thickness, then n versus R is a fixed relationship and can be characterized experimentally and analytically. On the other hand, if multiple process variables are changing, then n versus R may no longer be described by a simple relationship. For example, FIG. 5 shows the real index n versus reflectivity R for a set of 20 sliders coated with diamond-like carbon (DLC). The plot again displays a small degree of scatter about the linear fit, indicating that an accurate description of n versus R is possible.

Phase offsets for the above set of 20 DLC coated sliders at two different wavelengths are shown in FIG. 8, again compared to that obtained by an ellipsometer. The fluctuation in the ellipsometer phase offset relative to the new method is believed to be associated with scatter and diffraction loss due to grain structure of the slider. In general, however, it will be appreciated that the present invention operates on a wide range of slider types, and that the assumptions made herein do not unduly limit the range of application.

Although a method for computing the phase offset utilizing a linear relationship between the reflectance and index of refraction is shown and described, it is to be understood that the index needed to solve Equation 2 for phase offset can be estimated with other techniques. By way of example a fringe visibility function such as $(I_{max}-I_{min})/(I_{max}+I_{min})$ that is strongly dependent upon index n for the air-slider reflection and weakly dependent upon the extinction coefficient k can be used to estimate n directly from interferences data. A table of values giving n as a function of fringe visibility can be prepared. Given an estimated $n_1$ value and Ras determined using the method already described, the phase offset can then be calculated from equation 2.

What is claimed is:

1. An apparatus that measures a space between an essentially transparent member and a reflective member which has a reflectance and a real index of refraction, comprising:
   a light source that directs a light beam through the transparent member and the space to reflect off the transparent member and the reflective member to create an interference pattern;
   a detector that detects the interference pattern of the reflected light beam;
   a computer that computes the reflectance of the reflective member from the reflected light beam and computes the real index of refraction from the reflectance in accordance with a predetermined correlation between the reflectance and the real index of refraction, said computer further computes the space from the reflectance and the real index of refraction.

2. The apparatus as recited in claim 1, wherein the reflectance and a reflectance loss are computed from a maximum reflectance and a minimum reflectance that are computed from an interference maximum and an interference minimum detected from the interference pattern of the reflected light beam.

3. The apparatus as recited in claim 2, wherein the maxima reflectance and minima reflectance are computed from a maxima intensity, a minima intensity, a combined intensity of a light beam reflected from a top surface and an opposite bottom surface of the transparent member, and a top intensity of a light beam reflected from the top surface of the transparent member.

4. The apparatus as recited in claim 3, further comprising a prism, wherein the top intensity is measured by reflecting a light beam off of said prism and measuring the light reflected from said prism.

5. A flying height tester that measures a space between a substrate and a slider which has a reflectance and a real index of refraction, comprising:
   a light source that directs a light beam through the slider and the space to reflect off the substrate and the slider to create an interference pattern;
   a detector that detects the interference pattern of the reflected light beam;
   a computer that computes the reflectance of the reflective member from the reflected light beam and computes the real index of refraction from the reflectance in accordance with a predetermined correlation between the reflectance and the real index of refraction, said computer further computes the space from the reflectance and the real index of refraction.

6. The apparatus as recited in claim 5, wherein the reflectance and a reflectance loss are computed from a maxima reflectance and a minima reflectance that are computed from an interference maxima and an interference minima detected from the interference pattern of the reflected light beam.

7. The apparatus as recited in claim 6, wherein the maxima reflectance and minima reflectance are computed from a maxima intensity, a minima intensity, a disk intensity of a light beam reflected from a top surface and an opposite bottom surface of the disk, and a top disk intensity of a light beam reflected from the top surface of the disk.

8. The apparatus as recited in claim 7, further comprising a prism, wherein the top intensity is measured by directing a light beam into said prism and measuring the light reflected from said prism.

9. A method for measuring a space between a transparent member and a reflective member which has a reflectance and a real index of refraction, comprising the steps of:

a) directing a light beam through the transparent member and the space to reflect off the transparent member and the reflective member to create an interference pattern;
   b) detecting the interference pattern of the reflected light beam;
   c) computing the reflectance of the reflective member from the reflected light beam;
   d) computing the real index of refraction from the reflectance in accordance with an equation that correlates the reflectance with the real index of refraction; and,
   e) computing the space from the reflectance and the real index of refraction.

10. The method as recited in claim 9, further comprising the steps of detecting an interference maxima and an interference minima from the interference pattern of the reflected light beam, computing a maxima reflectance and a minima reflectance from the interference maxima and interference minima, and computing the reflectance and a reflectance loss from the maxima reflectance and the minima reflectance.

11. The method as recited in claim 10, further comprising the steps of measuring an intensity of a light beam reflected off a top surface of a prism and computing the maxima reflectance and the minima reflectance with the measured intensity.

12. An apparatus that measures a space between an essentially transparent member and a reflective member which has a reflectance and an extinction coefficient, comprising:
   a light source that directs a light beam through the transparent member and the space to reflect off the transparent member and the reflective member to create an interference pattern;
   a detector that detects the interference pattern of the reflected light beam;
   a computer that computes the reflectance of the reflective member from the reflected light beam and computes the extinction coefficient from the reflectance in accordance with a predetermined correlation between the reflectance and the extinction coefficient, said computer further computes the space from the reflectance and the extinction coefficient.

13. The apparatus as recited in claim 12, wherein the reflectance and a reflectance loss are computed from a maximum reflectance and a minimum reflectance that are computed from an interference maximum and an interference minimum detected from the interference pattern of the reflected light beam.

14. The apparatus as recited in claim 13, wherein the maxima reflectance and minima reflectance are computed from a maxima intensity, a minima intensity, a combined intensity of a light beam reflected from a top surface and an opposite bottom surface of the transparent member, and a top intensity of a light beam reflected from the top surface of the transparent member.

15. The apparatus as recited in claim 14, further comprising a prism, wherein the top intensity is measured by reflecting a light beam off of said prism and measuring the light reflected from said prism.

16. A flying height tester that measures a space between an essentially substrate and a slider which has a reflectance and an extinction coefficient, comprising:
   a light source that directs a light beam through the slider and the space to reflect off the substrate and the slider to create an interference pattern;
   a detector that detects the interference pattern of the reflected light beam; a computer that computes the reflectance of the reflective member from the reflected light beam and computes the extinction coefficient from the reflectance in accordance with a predetermined correlation between the reflectance and the extinction coefficient, said computer further computes the space from the reflectance and the extinction coefficient.

17. The apparatus as recited in claim 16, wherein the space-slider interface reflectance and a reflectance loss are computed from a maxima reflectance and a minima reflectance that are computed from an interference maxima and an interference minima detected from the interference pattern of the reflected light beam.

18. The apparatus as recited in claim 17, wherein the maxima reflectance and minima reflectance are computed from a maxima intensity, a minima intensity, a disk intensity of a light beam reflected from a top surface and an opposite bottom surface of the disk, and a top disk intensity of a light beam reflected from the top surface of the disk.

19. The apparatus as recited in claim 18, further comprising a prism, wherein the top intensity is measured by directing a light beam into said prism and measuring the light reflected from said prism.

20. A method for measuring a space between a transparent member and a reflective member which has a reflectance and a extinction coefficient, comprising the steps of:
 a) directing a light beam through the transparent member and the space to reflect off the transparent member and the reflective member to create an interference pattern;
 b) detecting the interference pattern of the reflected light beam;
 c) computing the reflectance of the reflective member from the reflected light beam;
 d) computing the extinction coefficient from the reflectance in accordance with an equation that correlates the reflectance with the extinction coefficient; and,
 e) computing the space from the reflectance and the extinction coefficient.

21. The method as recited in claim 20, further comprising the steps of detecting an interference maxima and an interference minima from the interference pattern of the reflected light beam, computing a maxima reflectance and a minima reflectance from the interference maxima and interference minima, and computing the reflectance and a reflectance loss from the maxima reflectance and the minima reflectance.

22. The method as recited in claim 21, further comprising the steps of measuring an intensity of a light beam reflected off a top surface of a prism and computing the maxima reflectance and the minima reflectance with the measured intensity.

23. An apparatus that measures a space between an essentially transparent member and a reflective member which has a reflectance, comprising:
 a light source that directs a light beam through the transparent member and the space to reflect off the transparent member and the reflective member to create an interference pattern;
 a detector that detects the interference pattern of the reflected light beam;
 a computer that computes the reflectance of the reflective member from the reflected light beam and a predetermined reflectance loss, and computes the space from the reflectance.

24. The apparatus as recited in claim 23, wherein said computer contains an equation that correlates the reflectance with a real index of refraction of the reflective member and utilizes the real index of refraction to compute the space.

25. The apparatus as recited in claim 23, wherein said computer contains an equation that correlates the reflectance with an extinction coefficient of the reflective member and utilizes the extinction coefficient to compute the space.

26. The apparatus as recited in claim 23, wherein the reflectance and the reflectance loss are computed from a maximum reflectance and a minimum reflectance that are computed from an interference maximum and an interference minimum detected from the interference pattern of the reflected light beam.

27. The apparatus as recited in claim 26, wherein the maxima reflectance and minima reflectance are computed from a maxima intensity, a minima intensity, a combined intensity of a light beam reflected from a top surface and an opposite bottom surface of the transparent member, and a top intensity of a light beam reflected from the top surface of the transparent member.

28. The apparatus as recited in claim 27, further comprising a prism, wherein the top intensity is measured by reflecting a light beam off of said prism and measuring the light reflected from said prism.

29. A flying height tester that measures a space between a substrate and a slider which has a reflectance, comprising:
 a substrate which has a top reflectance;
 a light source that directs a light beam through the slider and the space to reflect off said substrate and the slider to create an interference pattern;
 a detector that detects the interference pattern of the reflected light beam;
 a computer that computes the reflectance of the reflective member from the reflected light beam and the top reflectance of said substrate, and computes the space from the reflectance; and,
 a reference surface that is adjacent to said substrate and which is used to determine the top reflectance of said substrate.

30. The tester as recited in claim 29, wherein said computer contains an equation that correlates the reflectance with a real index of refraction of the slider and utilizes the real index of refraction to compute the space.

31. The tester as recited in claim 29, wherein said computer contains an equation that correlates the reflectance with an extinction coefficient of the slider and utilizes the extinction coefficient to compute the space.

32. The apparatus as recited in claim 29, wherein the reflectance and the reflectance loss are computed from a maxima reflectance and a minima reflectance that are computed from an interference maxima and an interference minima detected from the interference pattern of the reflected light beam.

33. The apparatus as recited in claim 32, wherein the maxima reflectance and minima reflectance are computed from a maxima intensity, a minima intensity, a disk intensity of a light beam reflected from a top surface and an opposite bottom surface of the disk, and a top disk intensity of a light beam reflected from the top surface of the disk.

34. The apparatus as recited in claim 33, wherein said reference surface is a prism.

* * * * *